United States Patent
Matsumoto et al.

(10) Patent No.: US 6,352,395 B1
(45) Date of Patent: Mar. 5, 2002

(54) TOOL HOLDER AND TOOL HOLDER ATTACHMENT MECHANISM

(75) Inventors: Masakazu Matsumoto; Masahiro Taguchi; Yusaku Yamamoto, all of Osaka (JP)

(73) Assignee: Nikken Kosakusho Works Ltd., Osaka-Fu (JP)

( * ) Notice: Subject to any disclaimer, the term of this patent is extended or adjusted under 35 U.S.C. 154(b) by 0 days.

(21) Appl. No.: 09/525,253

(22) Filed: Mar. 14, 2000

(30) Foreign Application Priority Data

| Mar. 19, 1999 | (JP) | 11-075433 |
| Apr. 30, 1999 | (JP) | 11-123545 |
| Aug. 3, 1999 | (JP) | 11-220101 |

(51) Int. Cl.$^7$ ................................................. B23C 5/00
(52) U.S. Cl. ..................... 409/234; 279/103; 408/239 R
(58) Field of Search ................................. 409/231, 232, 409/233, 234; 408/239 R, 239; 279/103, 102, 46.5, 46.8

(56) References Cited

U.S. PATENT DOCUMENTS

| 4,657,454 A | * | 4/1987 | Migita et al. | 409/234 |
| 4,673,319 A | * | 6/1987 | Ishikawa | 409/234 |
| 4,886,402 A | * | 12/1989 | Pfalzgraf | 409/234 |
| 5,593,258 A | * | 1/1997 | Matsumoto et al. | 409/234 |
| 5,716,173 A | * | 2/1998 | Matsumoto | 409/234 X |
| 5,964,556 A | * | 10/1999 | Toyomoto | 409/234 |

FOREIGN PATENT DOCUMENTS

| JP | 46-062467 | 7/1971 | | |
| JP | 49-125972 | 12/1974 | | |
| JP | 53-8949 | 4/1978 | | |
| JP | 58-94946 | 6/1983 | | |
| JP | 63-91335 | 6/1988 | | |
| JP | 401246006 | * 10/1989 | | 279/103 |
| JP | 5-177419 | 7/1993 | | |
| JP | 6-15947 | 1/1994 | | |
| JP | 6-114612 | 4/1994 | | |
| JP | 8-108302 | 4/1996 | | |
| JP | 8-174374 | 7/1996 | | |
| JP | 9-290302 | 11/1997 | | |
| JP | 3083291 | 6/2000 | | |

* cited by examiner

Primary Examiner—William Briggs
(74) Attorney, Agent, or Firm—Ladas & Parry

(57) ABSTRACT

A tool holder includes a holder body which in turn includes a shank portion, a flange portion, and a tool attachment portion; a taper cone fitted to the shank portion; an elastic member interposed between a rear-end face of the flange portion and a front-end face of the taper cone; and a stopper member disposed on the shank portion so as to support a rear-end face of the taper cone. The outer surface of the taper cone is tapered at an angle equal to that at which the wall surface of a taper hole formed in a spindle of a machine tool is tapered. The inner surface of the taper cone and the outer surface of the shank portion are equally tapered at an angle smaller than the angle at which the outer surface of the taper cone is tapered. Through drawing of the holder body, the taper cone expands radially to thereby be tightly held within the taper hole. A spacer is bonded to the end face of the spindle so as to eliminate a gap which is formed between the flange portion and a spindle.

9 Claims, 11 Drawing Sheets

TOOL HOLDER AND TOOL HOLDER ATTACHMENT MECHANISM

BACKGROUND OF THE INVENTION

1. Field of the Invention

The present invention relates to a tool holder to be removably attached to a spindle of a machine tool, as well as to a tool holder attachment mechanism.

2. Description of Related Art

A conventional tool holder has a structure in which a shank portion is tapered such that diameter decreases rearward (herein, the term "rear" or "rearward" refers to a direction toward a machine tool, and the term "front" or "frontward" refers to a direction away from the machine tool). A taper hole is formed in a front-end portion of a spindle of a machine tool such that diameter decreases rearward. The shank portion of the tool holder is inserted into the taper hole and drawn rearward by means of a draw member, whereby the tool holder is fixedly attached to the spindle.

However, the shank portion is restrained only through contact between the tapered outer circumferential surface of the shank portion and the wall surface of the taper hole formed in the spindle, while a gap is maintained between the front-end face of the spindle and the rear-end face of a flange portion of the tool holder located at the front side of the shank portion. Accordingly, the shank portion cannot be held with a sufficiently large force for coping with high-speed cutting or low-speed, heavy-duty cutting.

In an attempt to solve the problem, a force for restraining the shank portion of the tool holder has been increased. Specifically, restraint is effected through abutment between the front-end face of the spindle and the rear-end face of the flange portion of the tool holder, in addition to the restraint effected by means of the tapered outer circumferential surface of the shank portion and the wall surface of the taper hole.

However, in order to effect such restraint, relevant manufacturing tolerance must be rendered more severe, causing an increase in cost. Also, after long-term use of the spindle, need to repolish the taper hole arises. Since the size of the taper hole increases as a result of repolishing, restraint of the tool holder is effected simply by means of the end face of the flange portion of the tool holder and that of the spindle. Since no contact is established between the tapered shank portion and the taper hole, a tool shakes, disabling continuation of machining. Also, when the spindle rotates at high speed, a front-end portion of the taper hole formed in the spindle expands as a result of action of a centrifugal force, causing reduction in restraint effected by the taper hole. As a result, a tool held by the tool holder vibrates, causing impairment in machining accuracy.

In order to cope with the problem, a shank portion of a holder body of a flanged tool holder is formed to have a straight portion, and a taper cone is fitted to the straight portion. The taper cone is oriented such that diameter decreases rearward. The taper cone is preloaded by means of Belleville springs (disc springs) which are interposed between the taper cone and the shank portion, such that the outer circumferential surface of the taper cone is pressed against the wall surface of the taper hole. Application of the preload and rearward drawing of the holder body solve the problem to a certain extent, and manufacture is relatively easy. However, a force for drawing the holder body must be increased; otherwise, the taper cone is not sufficiently restrained by means of the wall surface of the taper hole.

In another tool holder, a shank portion of a holder body includes a straight larger-diameter end portion and a straight smaller-diameter end portion. A taper cone includes a corresponding larger-diameter straight hole and a corresponding smaller-diameter straight hole. However, as a result of employment of the straight holes in the taper cone, the holder body must be drawn by a considerably large force in order to effect sufficient restraint of the tool holder.

FIG. 17 shows a tool holder 30 which is fixedly attached to a tool machine, such as a machining center, by means of a conventional tool holder attachment mechanism. As shown in FIG. 17, the tool holder 30 includes a taper shank portion 31; a flange portion 32 to be gripped located at the larger-diameter side of the taper shank portion 31; and a cylindrical tool attachment portion 33 extending from an end face of the flange portion 32 in opposition to and in alignment with the taper shank 31.

In attachment of the tool holder 30 to a spindle 40 of a machine tool, the taper shank portion 31 is inserted into a taper hole 41 formed in the spindle 40, and a pull-stud draw mechanism disposed within the spindle 40 is engaged with an inserted end of the taper shank portion 31. The inserted end of the taper shank portion 31 is then drawn rearward by means of the pull-stud draw mechanism so as to closely fit the taper shank portion 31 into the taper hole 41, thereby attaching the tool holder 30 to the spindle 40.

According to JIS or ISO standard, in order to closely fit the taper shank portion 31 of the tool holder 30 into the taper hole 41 formed in the spindle 40, a predetermined gap D (about 2 mm or 3 mm) must be provided between an end face 401 of the spindle 40 and a corresponding end face 311 of the flange portion 32 of the tool holder 30. The standard prescribes that the tolerance in manufacture of the taper shank portion 31 with respect to the gap D be ±0.4 mm.

Through establishment of the gap D between the end face 401 of the spindle 40 and the end face 311 of the flange portion 32 of the tool holder 30, the taper shank portion 31 of the tool holder 30 can be closely fitted into the taper hole 41 formed in the spindle 40. However, close contact cannot be established between the end face 311 of the flange portion 32 of the tool holder 30 and the end face 401 of the spindle 40. As a result, a cutting load is concentratedly imposed on the taper shank portion 31 of the tool holder 30, accelerating tendency toward fretting corrosion of the contact surface between the taper hole 41 and the taper shank portion 31. Further, coupling rigidity between the tool holder 30 and the spindle 40 is impaired, resulting in a failure to perform heavy-duty cutting.

In order to cope with the problem, Japanese Utility Model Application Laid-Open (kokai) No. 15947/1994 proposes a tool holder attachment-mechanism in which a pair of horseshoe-like spacers 34 (FIG. 17) are screwed on the end face of a flange portion of a tool holder so as to fill the gap between the end face of a spindle and that of the flange portion.

In the conventional tool holder attachment mechanism shown in FIG. 17, the end face 311 of the flange portion 32 of the tool holder 30 can be brought into close contact with the end face 401 of the spindle 40 via the spacer 34, which is screwed on the end face 311 of the flange portion 32 of the tool holder 30. As a result, high coupling rigidity is established between the tool holder 30 and the spindle 40, thereby enabling heavy-duty cutting. However, since the spacer 34 having a thickness corresponding to the gap D must be custom-made for each model of tool holder, manufacture and management of the spacers 34 are troublesome and involve increased cost. The spacers 34 may be attached to the end face of the spindle. However, this causes the following problem. In the case of a newly manufactured machine tool, threaded holes can be formed in the end face of a spindle for use in screwing the spacers 34 into place. However, in the case of an existing machine tool, cutting such threaded holes raises a problem in machining accuracy, since, among components of the machine tool, the spindle involves the highest required accuracy.

SUMMARY OF THE INVENTION

The present invention has been accomplished in view of the above-mentioned problems. A first object of the present invention is to provide a tool holder which can be fitted into a taper hole formed in a spindle even when a force for drawing a holder body is relatively small, to thereby enable high-speed cutting or low-speed, heavy-duty cutting. Specifically, the first object is to provide a tool holder in which the outer circumferential surface of a shank portion of the holder body and the inner circumferential surface of a taper cone—which is fitted to the shank portion—are tapered more gently than are the wall surface of the taper hole and the outer circumferential surface of the taper cone (the taper hole and the taper cone are tapered such that diameter decreases rearward), so that the outer circumferential surface of the shank portion is locked into the taper cone through so-called wedging effect, and the outer circumferential surface of the taper cone imposes a radially expanding force on the wall surface of the taper hole.

A second object of the present invention is to provide a tool holder attachment mechanism allowing application of a single spacer to every tool holder or allowing easy attachment of the spacer to an either new or existing machine tool. Another object is to provide a highly safe tool holder attachment mechanism in which the spacer assumes an annular shape so as not to fly out during high-speed rotation.

A further object of the present invention is to provide a tool holder attachment mechanism in which a spacer bonded to the end face of a spindle permits use of a tool holder involving a problem in that the gap between the end face of the spindle and the and face of a flange portion of the tool holder becomes smaller than a gap specified in an industrial standard.

To achieve the first object, the present invention provides a tool holder to be removably fitted into a taper hole which is formed in a spindle of a machine tool such that diameter decreases rearward, comprising: a holder body, a rear portion of the holder body being formed into a shank portion, a flange portion being formed at a front side of the shank portion; a taper cone fitted to the shank portion and tapered such that diameter decreases rearward; an elastic member interposed between a rear end portion of the flange portion and a front-end portion of the taper cone fitted to the shank portion; and a stopper member disposed on the shank portion and adapted to support a rear-end face of the taper cone fitted to the shank portion. The outer circumferential surface of the taper cone is tapered at an angle equal to that at which the wall surface of the taper hole is tapered. The inner circumferential surface of the taper cone and the outer circumferential surface of the shank portion are tapered at least partially with respect to an axial direction such that diameter decreases rearward, at equal angles smaller than the angle at which the outer circumferential surface of the taper cone is tapered. The holder body is drawn rearward by means of a draw member disposed in the spindle. As a result, since the outer circumferential surface of the shank portion and the inner circumferential surface of the taper cone are tapered at equal angles, the taper cone is caused to radially expand to thereby press its outer circumferential surface against the wall surface of the taper hole. Accordingly, even when a force of drawing the holder body is weak, the outer circumferential surface of the taper cone is brought into close contact with the wall surface of the taper hole, so that the taper cone is sufficiently and strongly restrained within the taper hole, thereby enabling heavy-duty cutting and high-accuracy cutting by means of a tool held by a tool holder attached to the spindle.

The outer circumferential surface of the shank portion is locked into the taper cone through the so-called wedging effect, and the outer circumferential surface of the taper cone imposes a radially expanding force on the wall surface of the taper hole. As a result, an instantaneously-reached peak draw force can be maintained to thereby impose a large restraint force on the tool holder, thereby closely fitting the tool holder into the taper hole. The close fit of the tool holder into the taper hole yields excellent attenuation effect, thereby enabling high-speed cutting and low-speed, heavy-duty cutting.

According to the present invention, the inner circumferential surface of the taper cone and the outer circumferential surface of the shank portion are tapered substantially entirely with respect to the axial direction such that diameter decreases rearward, at equal angles smaller than the angle at which the outer circumferential surface of the taper cone is tapered. Thus, preferably, through effective use of the entire inner circumferential surface of the taper cone, the tool holder is used with a spindle in which a taper hole having a 1/10 taper is formed.

In another tool holder of the present invention, merely the outer circumferential surface of a front portion of the shank portion and the inner circumferential surface of a front portion of the taper cone are tapered at equal angles smaller than the angle at which the outer circumferential surface of the taper cone is tapered, thereby reducing an area to be tapered. Also, the outer circumferential surface of a rear portion of the shank portion and the inner circumferential surface of a rear portion of the taper cone are formed so as to extend straight. The rear portion of the taper cone is fitted to the rear portion of the shank portion. Thus, through use of the tool holder, cutting can be performed easily and accurately while vibration involved is comparatively small. Preferably, the tool holder is used with a spindle in which a taper hole having a 7/24 taper is formed.

In the tool holder of the present invention, a slit is preferably formed in the taper cone and is filled with an elastic member of, for example, fluorine-contained rubber, such that the elastic member is bonded to the taper cone. Accordingly, the filling elastic member prevents entry of dust.

In the tool holder of the present invention, the elastic member preferably comprises a plurality of Belleville springs and a washer disposed at at least the front or rear side of the plurality of Belleville springs, thereby applying a rearward force to the taper cone. Through modification of the number and thicknesses of washers, the position of the taper cone can be adjusted in the axial direction.

In the tool holder of the present invention, at least any one of a washer, a spring washer, and a nut to be screw-engaged with a rear-end portion of the shank portion is preferably disposed at the rear-end portion of the taper cone so as to support the rear-end portion of the taper cone, thereby enabling use of different pull studs.

In the tool holder of the present invention, preferably, a pair of arcuate shims are removably attached to a rear-end face of the flange portion and are adapted to abut the end face of the spindle, thereby enabling effective use of the holder body over a long period of time. Also, through use of shims of appropriate thickness, the gap between the end face of the spindle and the rear-end face of the flange portion can be eliminated.

In the tool holder of the present invention, components of the tool holder, such as the holder body and the taper cone, are preferably treated for corrosion protection, thereby enabling long-term use of the components.

To achieve the second object, the present invention provides a tool holder attachment mechanism comprising an annular spacer having a thickness corresponding to a specified gap±manufacturing tolerance (preferably, the sum of the specified gap and a maximum manufacturing tolerance) and being bonded to the end face of the spindle. Thus, a single spacer is applicable to every tool holder. The end face of the flange portion of the tool holder can be reliably brought into close contact with the end face of the spindle via the spacer. Further, the spacer assumes an annular shape so as not to fly out during high-speed rotation, thereby improving safety.

In the tool holder attachment mechanism of the present invention, the spacer is made of wear-resistant steel or hard rubber. Thus, even when the taper hole formed in the spindle wears, the spacer absorbs the wear to thereby maintain close contact between the taper shank portion and the taper hole, so that the tool holder can be reliably attached to the spindle.

In the tool holder attachment mechanism of the present invention, the adhesive application face of the spacer is preferably roughened so as to enhance bonding with the end face of the spindle, thereby establishing a strong bond between the spacer and the end face of the spindle.

In the tool holder attachment mechanism of the present invention, a portion of the spacer corresponding to a drive key projecting from the end face of the spindle is preferably cut out, so that the spacer can be bonded to the end face of the spindle without interference with the drive key.

In the tool holder attachment mechanism of the present invention, when a gap formed between the spindle and the flange portion of the tool holder upon attachment to the spindle becomes smaller than a gap specified in the industrial standard if the spacer is not present, the face of the spacer which faces the flange portion is preferably ground in an amount equal to the difference between the specified gap and the gap between the spindle and the flange portion, to thereby reduce the thickness of the spacer. Thus, the spacer bonded to the end face of the spindle permits use of a tool holder involving a problem in that a gap specified in the industrial standard cannot be formed. Further, through use of the spacer, close contact can be maintained between the taper shank portion and the taper hole, so that the tool holder can be reliably attached to the spindle.

In the tool holder attachment mechanism of the present invention, the spacer has a thinner portion around a cut-out portion. The thinner portion has a thickness less than a specified gap±manufacturing tolerance (preferably, than the specified gap less the manufacturing tolerance). Thus, even when a drive key projects from the end face of the spindle, the spacer bonded to the end face can be easily ground to a required thickness.

DESCRIPTION OF THE PREFERRED EMBODIMENTS

Embodiments of the present invention will next be described with reference to the drawings.

Figure 1:
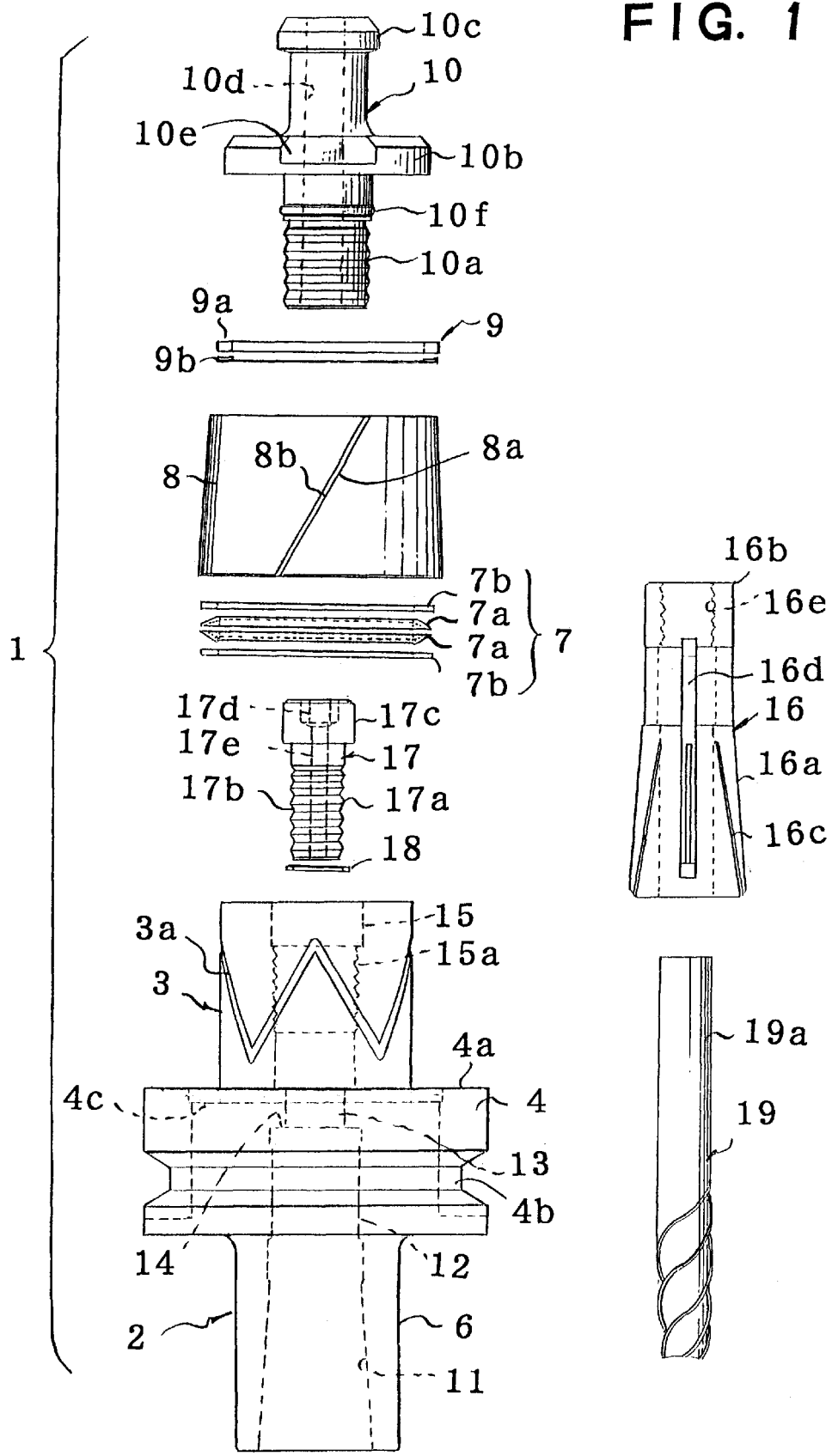
FIG. 1 is an exploded side view of a tool holder according to a first embodiment of the present invention.
Figure 2:
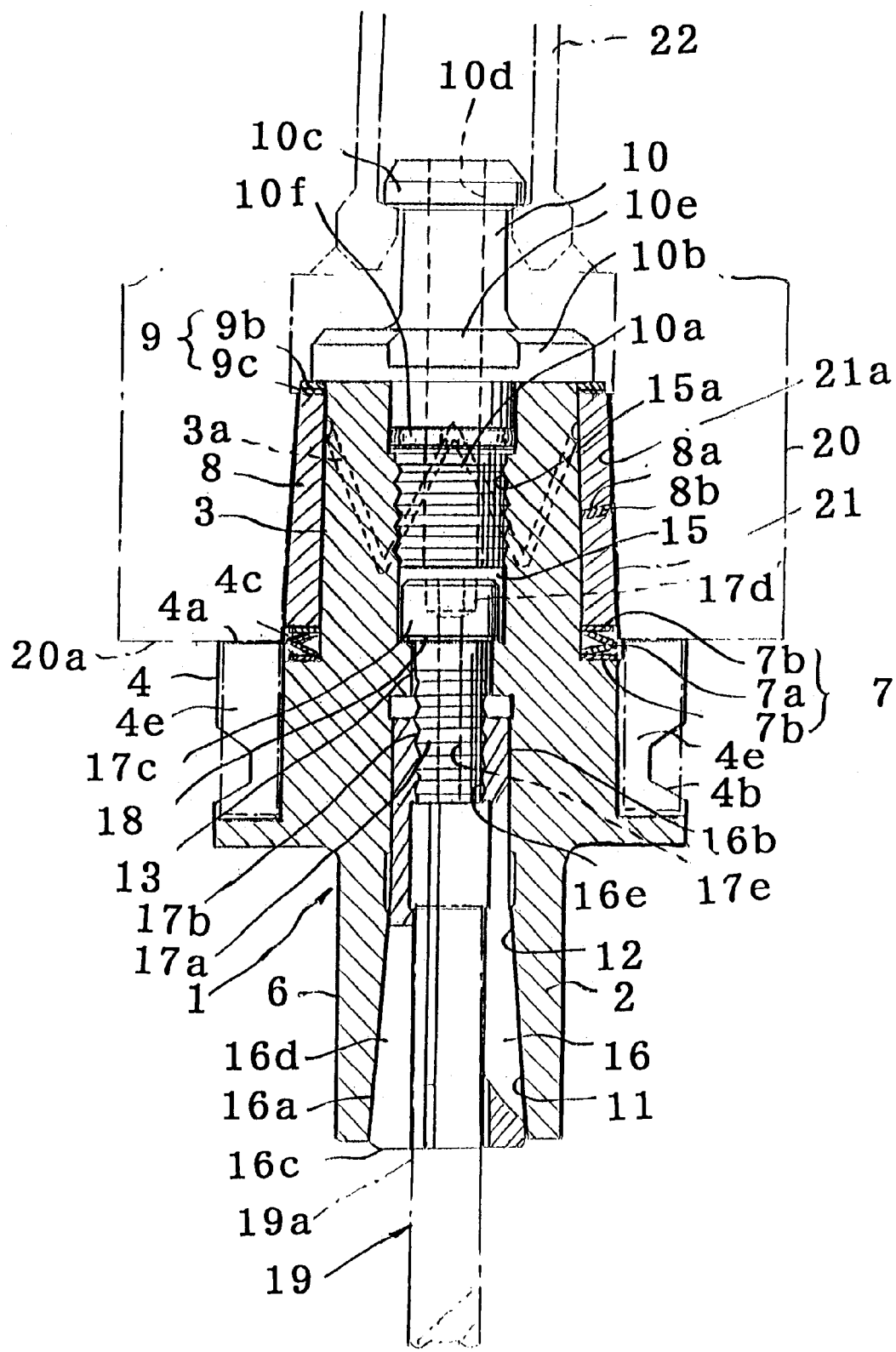
FIG. 2 is a longitudinal sectional view of the tool holder of FIG. 1.

FIGS. 1 and 2 show a tool holder 1 according to a first embodiment of the present invention. The tool holder 1 includes a holder body 2, which in turn includes a rear-end portion serving as a shank portion 3, a flange portion 4 located at the front side of the shank portion 3, and a front-end portion (tool attachment portion) 6 located at the front side of the flange portion 4.

A rear-end face 4a of the flange portion 4 is formed perpendicularly to the axial direction. A trapezoidal groove 4b is formed in the outer circumferential surface of the flange portion 4 so as to allow engagement with an arm (not shown) of an automatic tool changer. An annular depression 4c is formed on the rear-end face 4a of the flange portion 4 so as to accommodate an elastic member 7, which will be described later. Reference numerals 4e denote keyways.

A taper cone 8 is fitted to the shank portion 3 in an axially slidable manner while the elastic member 7 abuts the front-end face thereof, thereby forming a taper shank. A stopper member 9 for preload adjustment, which will be described later, is fitted to the shank portion 3 so as to be located at a rear-end portion of the taper cone 8. A pull stud 10 is screw-engaged with a rear-end portion of the shank portion 3 to thereby support the rear-end face of the stopper member 9. Thus, the pull stud 10 presses the taper cone 8 against the elastic member 7 via the stopper member 9, thereby imposing preload on the taper cone 8 through compression of the elastic member 7.

Figure 3:
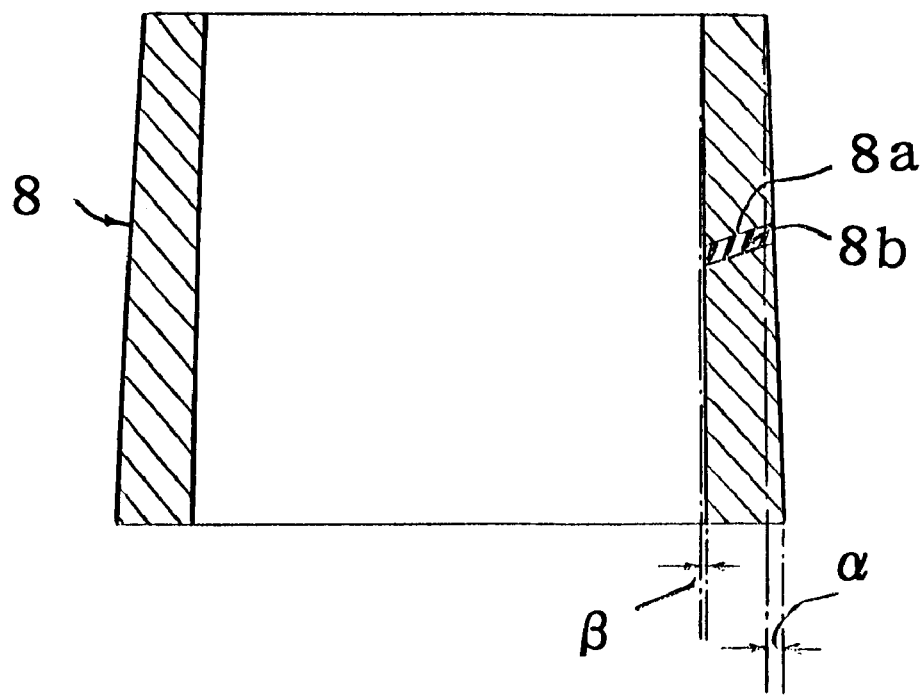
FIG. 3 is an enlarged longitudinal sectional view of a taper cone of the tool holder of FIG. 1.

As shown in FIG. 3, the taper cone 8 is tapered such that diameter decreases rearward. The entire outer circumferential surface of the taper cone 8 assumes a taper α of 1/10, whereas the entire inner circumferential surface of the taper cone 8 assumes a taper β of 1/50. The taper α is rendered gentler than the taper β.

Figure 4:
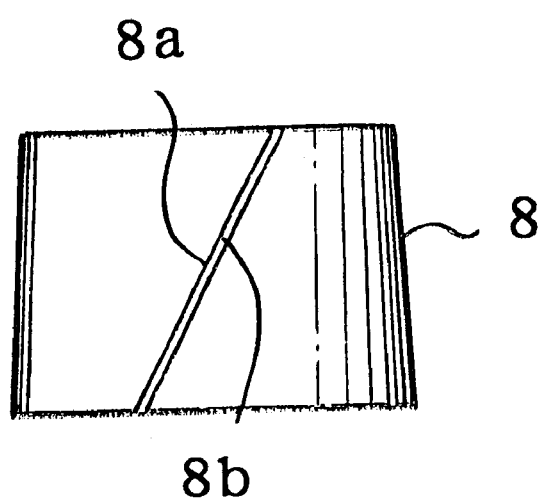
FIG. 4 is a front view of the taper cone of the tool holder of FIG. 1.

As shown in FIGS. 3 and 4, a single slit 8a is formed in the taper cone 8 over the entire length of the taper cone 8 while being gently inclined with respect to the axial direction. The slit 8a is filled with an elastic member 8b of, for example, fluorine-contained rubber, so that the taper cone 8 becomes elastically deformable in a radial direction. The elastic member 8b fills the slit 8a in such a manner as not to project beyond the inner and outer circumferential surfaces of the taper cone 8. Also, the elastic member 8b is bonded to the opposite end faces which define the slit 8a, thereby preventing entry of dust there through.

The elastic member 7 includes a plurality of Belleville springs 7a, which assume an annular form and are made of an elastic metallic plate such as steel plate, and sheets 7b, which assume an annular form and are made of a metallic sheet. At least a portion of the Belleville springs 7a and sheets 7b are accommodated in the annular depression 4c so that the elastic member 7 is interposed between the bottom of the depression 4c and the front face of the taper cone 8.

The stopper member 9 includes an elastic ring 9a and a washer 9b, which are superposed on each other such that a larger-diameter support portion 10b of the pull stud 10 supports the rear-end face of the taper done 8 therethrough.

A lubricant accommodation groove 3a is formed in the outer circumferential surface of the shank portion 3 to which the taper cone 8 is fitted, in a continuously zigzag manner and in a circumferential direction. The accommodation groove 3 is filled with a lubricant, such as grease, so as to permit smooth relative motion between the shank portion 3 and the taper cone 8 over a long period of time.

A taper hole 11 adapted to hold a collet is formed in the holder body 2 in such a manner as to axially extend from the front end of the holder body 2 to an intermediate portion of the holder body 2. A straight hole 12 is formed in the holder body 2 in such a manner as to extend rearward from the rear end of the taper hole 11. A small bolt hole 13 is formed in the holder body 2 in such a manner as to extend rearward from the rear end of the straight hole 12, thereby forming a bolt support portion 14 which circularly projects toward the center of the bolt hole 13. A rear-end-portion hole 15 is formed in the holder body 2 in such a manner as to extend rearward from the rear end of the bolt hole 13 to the rear-end face of the holder body 2. A female-threaded portion 15a is formed at an axially appropriate portion of the rear-end-portion hole 15. The holes 11, 12, 13, and 15 are aligned with each other and share the axis of the holder body 2 as their common axis.

A male-threaded front-end portion 10a of the pull stud 10 is engaged with the female-threaded portion 15a of the rear-end-portion hole 15, thereby causing the larger-diameter support portion 10b to abut the rear-end face of the shank portion 3. An engagement portion 10c projects rearward from the rear-end face of the larger-diameter support portion 10b. A through-hole 10d is coaxially formed through the pull stud 10. Flat cut portions be are formed on the larger-diameter support portion 10b in opposition to each other.

Reference numeral 10f denotes a seal member which is disposed on the rear side of the male-threaded front-end portion 10a of the pull stud 10.

The taper collet 16 is attached to the holder body 2 such that a front taper portion 16a of the taper collet 16 is fitted into the taper hole 11 formed in the holder body 2, and a straight rear-end portion 16b is fitted into the straight hole 12. The outer circumferential surface of the taper portion 16a of the taper collet 16 has a taper equal to that of the taper hole 11. Three slits 16c are formed in the taper portion 16a and are arranged at circumferentially equal intervals. Cutting fluid feed grooves 16d are formed in the inner circumferential surface of the taper collet 16 and are each arranged in a circumferentially center position between the adjacent slits 16c. A female-threaded hole 16e is coaxially formed through the rear-end portion 16b of the taper collet 16.

The slits 16c extend over the entire length of the taper portion 16a of the taper collet 16. The cutting fluid feed grooves 16d are narrow and extend from the front end of the taper collet 16 to the rear-end portion 16b.

A draw bolt 17 is inserted into the rear-end-portion hole 15 from the rear-end face of the holder body 2. A leg portion 17a of the draw bolt 17 is inserted into the bolt hole 13 from the rear end thereof. A male-threaded portion 17b formed on the leg portion 17a is engaged with the female-threaded hole 16e formed in the rear-end portion 16b of the collet 16. An engagement socket 17d having a cross section of regular hexagon is formed in a head portion 17c of the draw bolt 17. A cutting fluid hole 17e of a small diameter is coaxially formed through the draw bolt 17 so as to extend from the bottom of the engagement socket 17d to the front-end face of the leg portion 17a. The head portion 17c rests on the rear-end face of the bolt support portion 14 of the holder body 2 via a washer 18 fitted to the leg portion 17a.

Reference numeral 19 denotes a tool, such as an end mill or a drill. A shank 19a of the tool 19 is fitted into the taper collet 16.

In FIG. 2, reference numeral 20 denotes a spindle of a machine tool. A taper hole 21 is formed in a front-end portion of the spindle 20 in such a manner as to extend to the front-end face of the spindle 20. A wall surface 21a of the taper hole 21 is tapered such that diameter decreases rearward at a 1/10 taper. A draw member 22 is disposed in the spindle 20 on the rear side of the taper hole 21.

Metallic members, such as the holder body 2, the taper cone 8, and the taper collet 16, are treated for corrosion protection so as not to rust through contact with cutting fluid.

When the above-described tool holder 1 of the first embodiment is to be used, the arm of an automatic tool changer is caused to hold the flange portion 4 of the tool holder 1 through engagement with the trapezoidal groove 4b. The engagement portion 10c of the pull stud 10 of the tool holder 1 is engaged with a front-end portion of the draw member 22 disposed within the spindle 20 of a machine tool. The pull stud 10 is drawn rearward to thereby bring the outer circumferential surface of the taper cone 8 of the tool holder 1 into close contact with the inner circumferential surface of the spindle 20. Through further rearward drawing of the pull stud 10, the shank portion 3 of the holder body 2 connected with the pull stud 10 and the taper cone 8 fitted to the shank portion 3 are drawn rearward. Since the outer circumferential surface of the shank portion 3 and the inner circumferential surface of the taper cone 8 are equally tapered at a gentle taper of, for example, 1/50 such that diameter decreases rearward, drawing of the shank portion 3 has a wedging effect on the taper cone 8 as represented with arrows K in FIG. 5. As a result, the inner circumferential surface of the taper cone 8 is radially expanded, thereby effecting a radially expanding force as represented with arrows N in FIG. 5.

Figure 5:
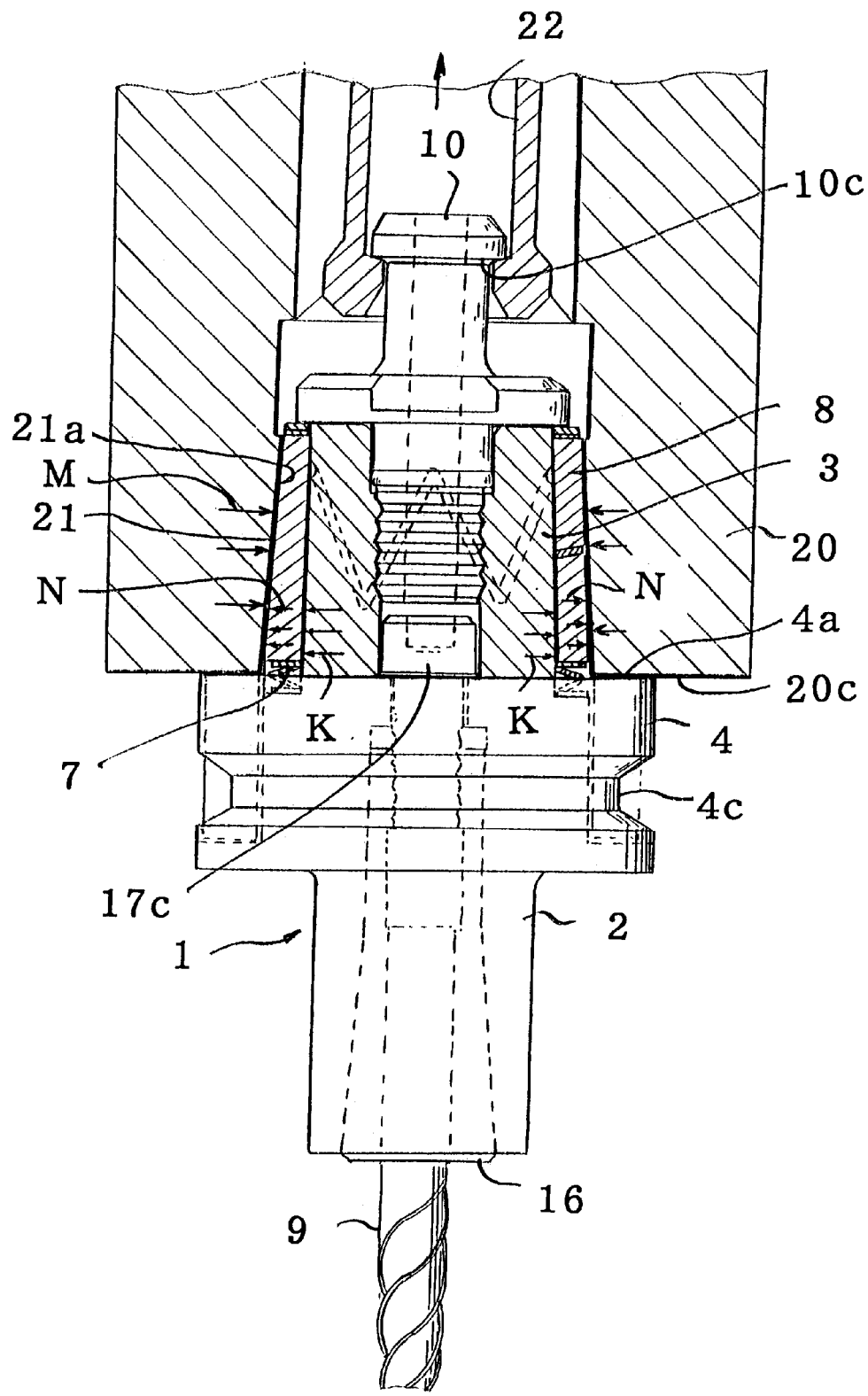
FIG. 5 is a view for explaining operation of the tool holder of FIG. 1.

Since the wall surface 21a of the taper hole 21 formed in the spindle 20 and the outer circumferential surface of the taper cone 8 are equally tapered at a taper of 1/10 such that diameter decreases rearward, the wall surface 21a of the taper hole 21 imposes a clamping force as represented with arrows M in FIG. 5 on the outer circumferential surface of the taper cone 8 in such a manner as to squeeze the taper cone 8. Since a radially expanding force as represented with arrows N acts on the taper cone 8, the taper cone 8 is strongly restrained in the spindle 20 even when a force of drawing the tool holder 1 is relatively weak.

As well known, the smaller the taper angle, the higher the coupling rigidity.

Figure 6:
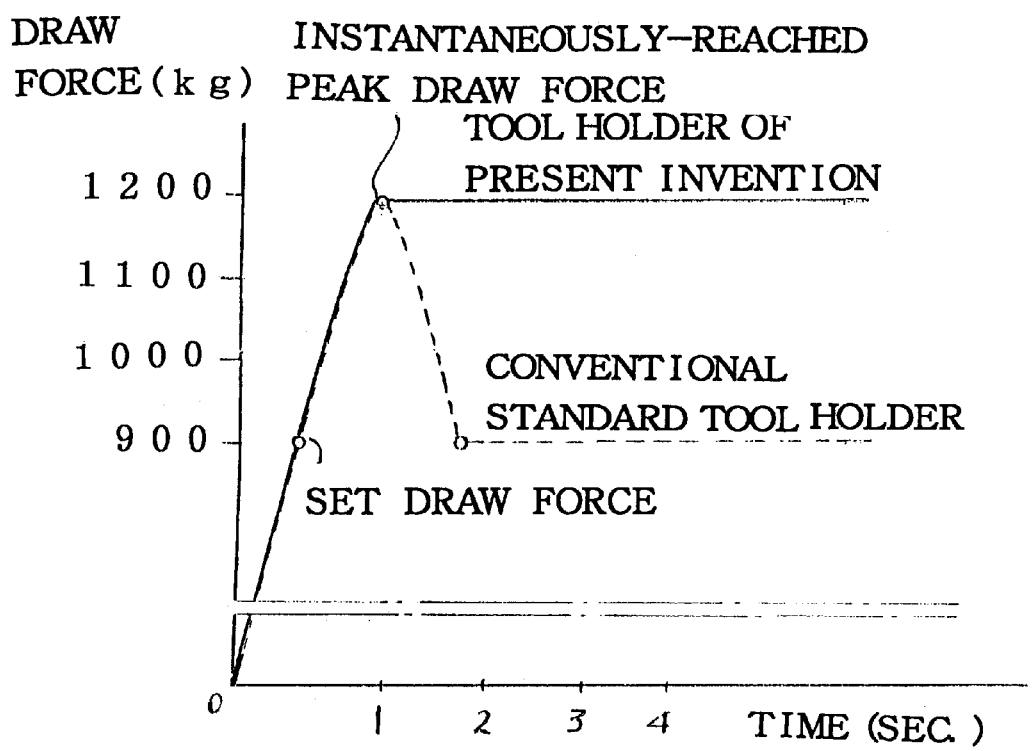
FIG. 6 is a graph showing a comparison of a draw force as observed with time between a tool holder of the present invention and a conventional standard-type tool holder.

FIG. 6 shows a comparison of a force of drawing the holder body 2 into the taper hole 21 formed in the spindle 20 by means of a draw bar between the tool holder 1 of the present invention and a conventional standard-type tool holder.

A Belleville spring (not shown) is disposed in a compressed state in order to draw the draw member 22 connected to a draw bar (not shown). For example, when a force of drawing the holder body 2 is set at 900 kg, the Belleville spring instantaneously exerts a draw force 1.3 to 1.8 times the set value; i.e., about 1200 kg on the tool holder 1 upon attachment of the tool holder 1 into the taper hole 21 formed in the spindle 20. This action of the Belleville spring is called a hammering effect. The instantaneously-reached peak draw force varies depending on the set draw force and a drawing speed.

In the conventional standard-type tool holder, the inner circumferential surface of a taper cone and the outer circumferential surface of a shank portion are axially straight. Thus, the instantaneously-reached peak draw force soon returns down to the set draw force, or 900 kg, as represented with a dashed line. Cutting is performed while the draw force is maintained at 900 kg.

In the case of the tool holder 1 of the present invention, when the tool holder 1 is attached into the taper hole 21 formed in the spindle 20, the draw bar draws the pull stud 10 rearward. The shank portion 3 of the holder body 2 connected to the pull stud 10 and the taper cone 8 fitted to the shank portion 3 are drawn rearward. The outer circumferential surface of the shank portion 3 and the inner circumferential surface of the taper cone 8 are equally tapered at a gentle taper of 1/50 such that diameter decreases rearward. Accordingly, as a result of the shank portion 3 being drawn rearward, the outer circumferential surface of the shank portion 3 is locked into the taper cone 8 through the so-called wedging effect. Further, the outer circumferential surface of the taper cone 8 imposes a radially expanding force on the wall surface 21a of the taper hole 21 formed in the spindle 20. As a result, the tool holder 1 is restrained within the spindle 20 while an instantaneously-reached peak draw force of 1200 kg is maintained.

Accordingly, the tool holder 1 fitted into the taper hole 21a formed in the spindle 20 can be restrained by a large force, thereby enabling high-speed cutting and low-speed, heavy-duty cutting.

When the present invention is applied to drawing means of a spindle which has been used for 4 or 5 years and thus involves a reduction in draw force, the draw force can be enhanced by virtue of a feature of the invention in that a tool holder can be restrained while an instantaneously-reached peak draw force is maintained.

After attachment of the tool holder 1, the arm of the automatic tool changer is disengaged from the trapezoidal groove 4b and is then returned to its home position.

When the tool holder 1 is to be replaced with another one after completion of cutting, the arm of the automatic tool changer is engaged with the trapezoidal groove 4b to thereby chuck the flange portion 4. Then, the arm pulls out the tool holder 1 frontward from the spindle 20.

According to the first embodiment, the larger-diameter support portion 10b of the pull stud 10 screw-engaged to the rear-end portion of the shank portion 3 abuts the rear-end face of the shank portion 3 to thereby press forward the rear-end face of the taper cone 8 fitted to the shank portion 3 of the holder body 2. The elastic member 7 is fitted into the annular depression 4c formed on the rear-end face 4a of the flange portion 4. Thus, the front-end face of the taper cone 8 is pressed against the flange portion 4 via the elastic member 7. Accordingly, the taper cone 8 is movable in the axial direction of the shank portion 3. A single slit 8a is formed in the taper cone 8 over the entire length of the taper cone 8 and is filled with the elastic member 8b. Thus, the taper cone 8 can radially expand or contract, and the taper cone 8 can be closely fitted into the taper hole 21 formed in the spindle 20. Also, the rear-end face 4a of the flange portion 4 can be reliably brought into close contact with an end face 20a of the spindle 20.

When the tool 19 needs to be replaced because of wear or chipping of its cutting edge, the tool holder 1 is detached from a machine tool and is then brought to a replacement shop. The flange portion 4 of the holder body 2 is clamped by a vise fixed on a vise bench. A front-end portion of an L-shaped Allen wrench having a cross section of regular hexagon is inserted into the through-hole 10d formed in the pull stud 10, from the rear end side of the pull stud 10 to thereby be fitted into the engagement socket 17d formed in the head portion 17c of the draw bolt 17.

Then, the Allen wrench is rotated so as to loosen the draw bolt 17 until the head portion 17c abuts the pull stud 10. The Allen wrench is further rotated in the same direction, causing the collet 16 to be moved forward as a result of engagement of the male-threaded portion 17b of the draw bolt 17 and the female-threaded hole 16e formed in the collet 16. Thus, the taper hole 11 formed in a front-end portion of the holder body 2 unlocks the collet 16.

Thus, the taper portion 16a of the collet 16 unlocks the shank 19a of the tool 19. The tool 19 is removed from the collet 16. Then, the shank 19a of for example, a new tool 19 is fitted into the taper portion 16a of the collet 16. Subsequently, the draw bolt 17 is rotated and screwed into a rear portion of the holder body 2 by means of the Allen wrench, thereby locking the taper portion 16a of the collet 16 through engagement with the taper hole 11 formed in the holder body 2. Thus, the shank 19a of the tool 19 is fixedly held at a front-end portion of the holder body 2. Subsequently, the Allen wrench is removed from the rear side of the tool holder 1. The flange portion 4 of the tool holder 1 is released from the vise, enabling reuse of the tool holder 1.

Subsequently, the tool holder 1 is attached to the spindle 20. When, in order to start cutting a workpiece, the tool 19 chucked by the tool holder 1 is moved toward the workpiece while the spindle 20 is being rotated, cutting fluid is fed from a central portion of the spindle 20. The thus-fed cutting fluid flows through the through-hole 10d formed in the pull stud 10, the rear-end-portion hole 15 formed in the holder body 2, the engagement socket 17d formed in the draw bolt 17, the rear-end portion 16b of the collet 16, and through the cutting fluid feed groove 16d formed in the collet 16, and is then discharged from the front end of the collet 16 and along the outer circumferential surface of the tool 19. The thus-discharged cutting fluid cools the cutting edge of the tool 19 and a portion of the workpiece which is being cut by the cutting edge.

In the first embodiment, the flange portion and the holder body may be formed integrally. Alternatively, the entire flange portion or the entire flange portion except a front-end portion thereof may be formed as a separate member. The member may be shrinkage-fitted to the holder body.

In the first embodiment, the wall surface of the taper hole formed in a front-end portion of the spindle and the outer circumferential surface of the taper cone may be tapered at a steep taper of, for example, 7/24 such that diameter decreases rearward, whereas the inner circumferential surface of the taper cone and the outer circumferential surface of the shank portion of the holder body may be tapered at a gentle taper of, for example, 1/50 such that diameter decreases rearward.

Figure 7:
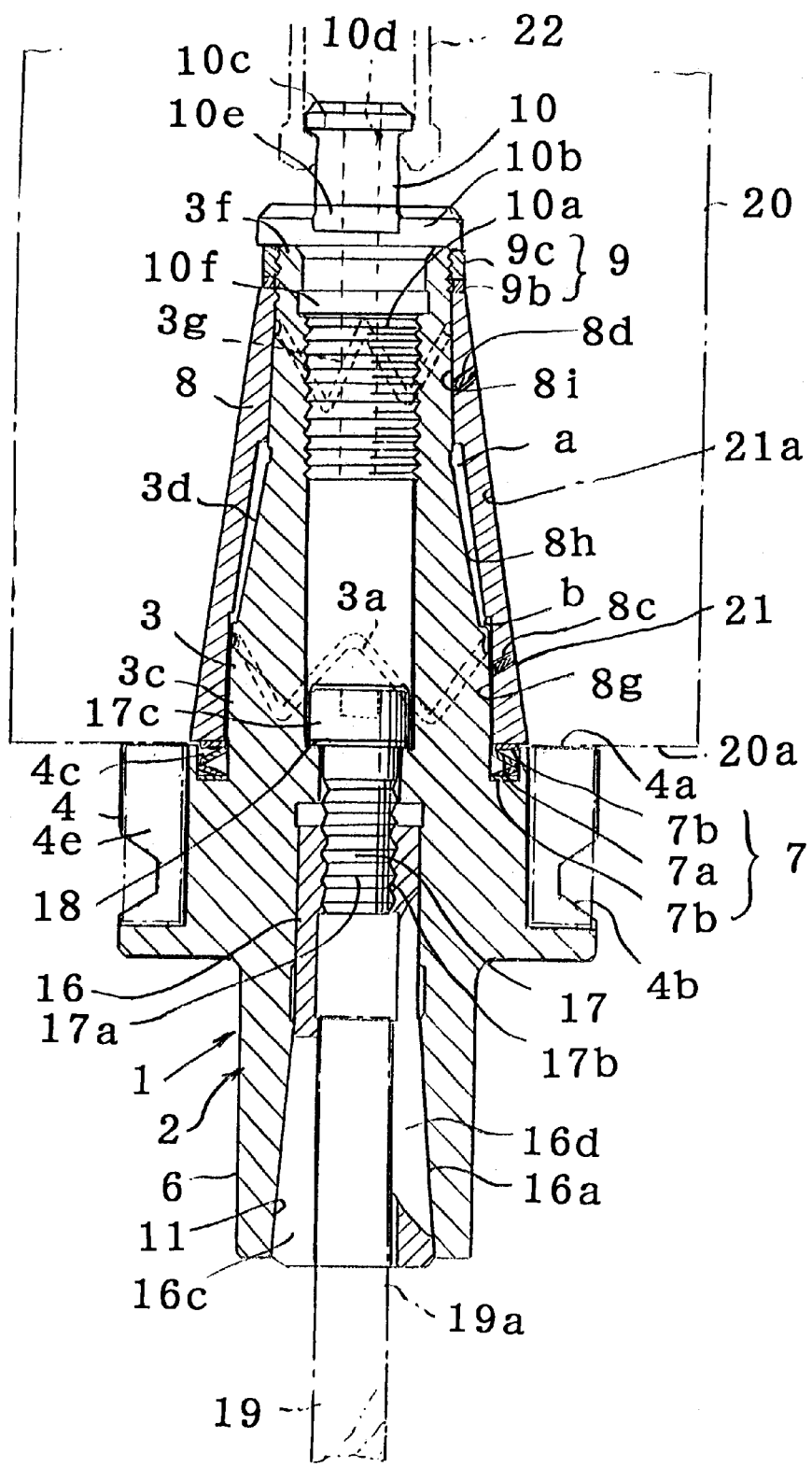
FIG. 7 is a longitudinal sectional view of a tool holder according to a second embodiment of the present invention.

FIG. 7 shows a tool holder 1 according to a second embodiment of the present invention. As shown in FIG. 7, the tool holder 1 includes a holder body 2, which in turn includes a rear-end portion serving as a shank portion 3 and a flange portion 4 located at the front side of the shank portion 3.

An annular depression 4c is formed on a rear-end face 4a of the flange portion 4. An elastic member 7 is fitted into the annular depression 4c. A taper cone 8 is rotatably fitted to the shank portion 3. A stopper member 9 for preload adjustment is located at a rear-end portion of the shank portion 3.

The entire outer circumferential surface of the taper cone 8 is tapered at a steep taper of 7/24. A front portion 8g of the inner circumferential surface of the taper cone 8 is tapered at a gentle taper of 1/10 to 1/100, preferably 1/50. An intermediate portion 8h of the taper cone 8 extends rearward from the front portion 8g via a step and slightly projects toward the axis of the taper cone 8. A straight portion 8i of the taper cone 8 extends rearward from the intermediate portion 8h.

A front portion 3c of the outer circumferential surface of the shank portion 3 is tapered at a gentle taper equal to that of the front portion 8g of the taper cone 8; specifically, a taper of 1/10 to 1/100, preferably 1/50. An intermediate portion 3d of the shank portion 3 extends rearward from the front portion 3c and is slightly reduced in diameter. A cylindrical straight portion 3e of the shank portion 3 extends rearward from the intermediate portion 3d. A rear-end portion 3f of the shank portion 3 extends rearward from the straight portion 3e and has an external diameter equal to that of the straight portion 3e.

The taper cone 8 is fitted to the shank portion 3. Specifically, the front portion 8g of the taper cone 8 is fitted to the front portion 3c of the shank portion 3. A radial gap a and an axial gap b are formed between the intermediate portion 8h of the taper cone 8 and the intermediate portion 3d of the shank portion 3. The straight portion 8i of the taper cone 8 is fitted to the straight portion 3f of the shank portion 3.

The stopper member 9 includes a washer 9b and a nut 9c. The washer 9b is fitted to the rear-end portion 3f of the shank portion 3 which projects from the rear-end face of the taper cone 8. The nut 9c is screw-engaged with the rear-end portion 3f so as to press the washer 9b against the rear-end face of the taper cone 8.

A lubricant accommodation grooves 3a and 3g are formed in the outer surface of the front-portion 3c of the shank portion 3 and in the outer surface of the straight portion 3e of the shank portion 3, respectively, in a continuously zigzag manner. The accommodation grooves 3a and 3g are filled with lubricant.

A taper hole 21 is formed in a front-end portion of a spindle 20 of a machine tool in such a manner as to extend from the front-end face of the spindle 20. A wall surface 21a of the taper hole 21 is tapered at a steep taper of 7/24 such that diameter decreases rearward.

Other features of the tool holder of the second embodiment are the same as those of the tool holder of the first embodiment.

The tool holder of the second embodiment is used and yields effects as is and does the tool holder of the first embodiment. However, in the case of the second embodiment, since the tapered front-end portion 8g of the taper cone 8 is fitted to the tapered front portion 3c of the shank portion 3, a portion of the taper cone 8 and a portion of the shank portion 3 which are to be tapered are shorter. Thus, tapering is easier. Since the rear straight portion 8i of the taper cone 8 is fitted to the rear straight portion 3e of the shank portion 3, the taper cone 8 is supported on the shank portion 3 at the two portions; i.e., at the front and rear portions. Thus, vibration of the tool holder during cutting can be reduced, thereby improving cutting accuracy.

Figure 8:
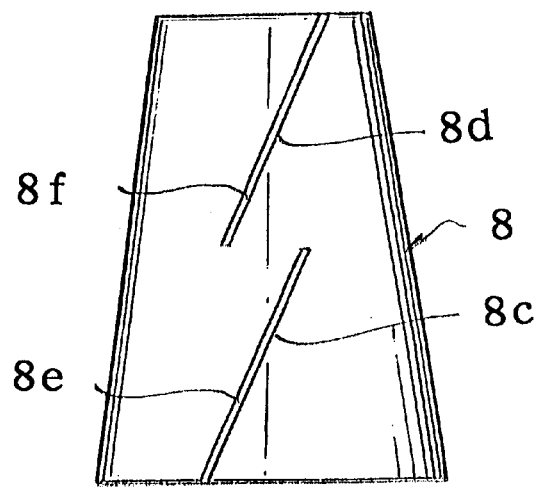
FIG. 8 is a front view of a taper cone of the tool holder of FIG. 7.

The tool holder 1 of the second embodiment can use a modified embodiment of the taper cone 8 shown in FIG. 8. A front slit 8c and a rear slit 8d are formed in the taper cone 8 in such a manner as to extend to an intermediate portion of the taper cone 8 from the front and rear ends, respectively, of the taper cone 8. The front slit 8c and the rear slit 8d are inclined equally with respect to the axial direction. The front and rear slits 8c and 8d are filled with elastic elements 8e and 8f, respectively, of, for example, fluorine-contained rubber. The slit 8c (8d) is bonded to the opposite end faces which define the slit 8c (8d), thereby preventing entry of dust therethrough. Since the slits 8c and 8d are shorter, cutting of the slits 8c and 8d become easier. Also, impairment of the elastic members 8e and 8f is slowed down, thereby enabling long-term use of then elastic members 8e and 8f.

Features of the taper cone 8, such as the tapers of the inner and outer circumferential surfaces, are the same as those of the taper cone 8 shown in FIG. 7.

Figure 9:
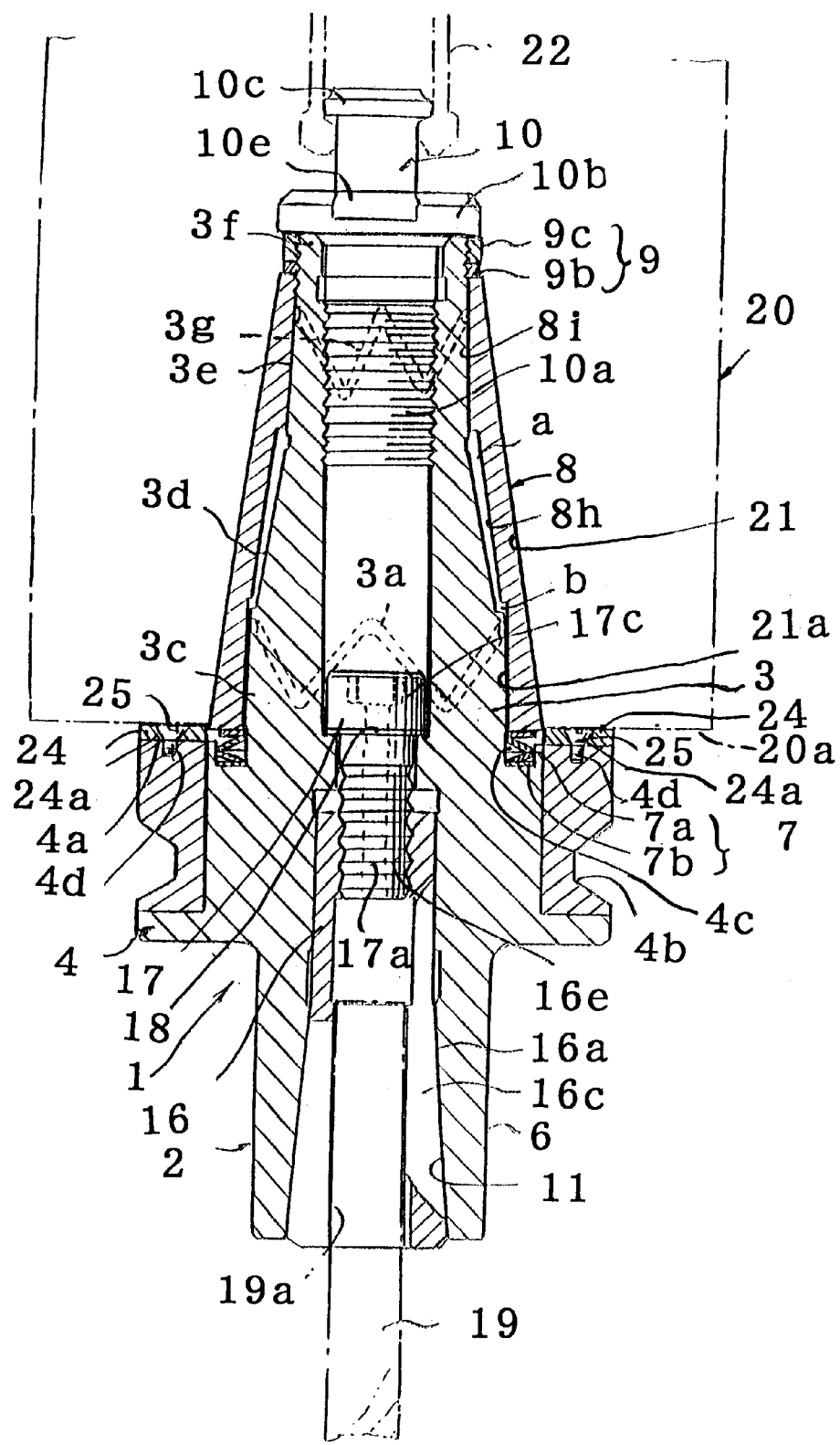
FIG. 9 is a longitudinal sectional view of a tool holder according to a third embodiment of the present invention.

FIG. 9 shows a tool holder 1 according to a third embodiment of the present invention. As shown in FIG. 9, the tool holder 1 includes two flat arcuate shims 24 which are disposed apart from each other on the rear-end face 4a of the flange portion 4 of the holder body 2. A plurality of holes 24a are formed in the shims 24. A plurality of flat head screws 25 are inserted through,the corresponding holes 24a and are removably engaged with corresponding female-threaded holes 4d which are formed in the rear-end face 4a of the flange portion 4. Thus, the rear faces of the shims 24 come into close contact with the end face 20a of the spindle 20.

Other features of the tool holder of the third embodiment are the same as those of the tool holder of the second embodiment.

The tool holder of the third embodiment is used and yields effects as is and does the tool holder of the second embodiment. However, in the case of the third embodiment, when the shims 24 suffer wear or any other damage as a result of attaching the tool holder 1 to or detaching from the spindle 20 a large number of times, the shims 24 may be replaced with new ones. When the rear-end face 4a of the flange portion 4 to which the shims 24 are not attached is damaged as a result of attaching the tool holder 1 to or detaching from the spindle 20 a large number of times, the rear-end face 4a may be ground, and then shims of appropriate thickness may be fixedly attached to the rear-end face 4a by means of flat head screws. Preferably, shims of different thicknesses may be kept so that shims of an appropriate thickness can be promptly used as needed.

The tool holders of the above-described embodiments are not limited to use with a spindle of a vertical machine tool, but may be used with a spindle of a horizontal machine tool.

The taper cone of the tool holder of each embodiment described above does not need to have a slit formed therein.

An embodiment of a tool holder attachment mechanism according to the present invention will next be described with reference to FIGS. 10 to 16.

Figure 10:
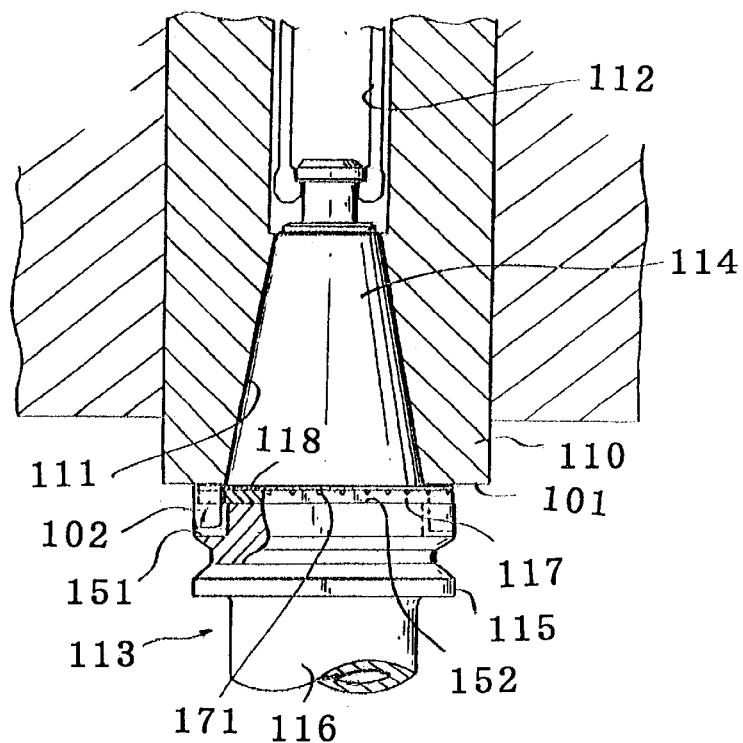
FIG. 10 is a longitudinal sectional view of a tool holder attachment mechanism of the present invention.
Figure 11:
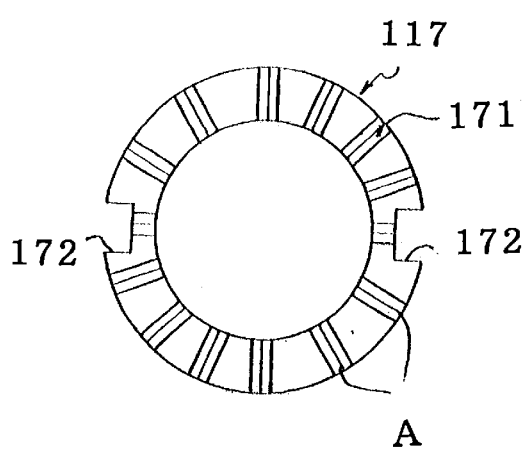
FIG. 11 is a plan view showing an example of a spacer of the tool holder attachment mechanism of FIG. 10.

FIG. 10 is a longitudinal sectional view showing the embodiment of a tool holder attachment mechanism according to the present invention. FIG. 11 is a plan view showing an example of a spacer of the tool holder attachment mechanism of the present invention.

In FIG. 10, reference numeral 110 denotes a spindle of a machine tool, such as a machining center. A taper hole 111 for reception of a tool is formed in the spindle 110. A pull stud mechanism 112 is disposed within:the spindle 110 in order to closely fit a tool holder, which will be described later, into the taper hole 111.

A tool holder 113 includes a taper shank portion 114 to be closely fitted into the taper hole 111 formed in the spindle 110; a flange portion 115 adapted to be gripped and formed at a larger-diameter end portion of the taper shank portion 114; and a cylindrical tool attachment portion 116 which extends from the front-end face of the flange portion 115 coaxially and in opposition to the taper shank portion 114. Drive key grooves 151 are formed in the flange portion 115 so as to be engaged with corresponding drive keys 102 which project from an end face 101 of the spindle 110.

A spacer 117 is bonded by means of a layer of adhesive 118 (not greater than 0.3 mm thick, for example) to the end face 101 of the spindle 110 in such a manner as to face an end face 152 of the flange portion 115.

The adhesive 118 may be a two-part epoxy resin (for example, THREE-BOND ADHESIVE (trade name, product of Osaka Three Bond) or ARALDITE STANDARD ADHESIVE (trade name, product of Nagase Chiba)).

The spacer 117 assumes an annular shape and is made of wear-resistant steel or hard rubber, so as to be compatible with the end face 152 of the flange portion 115 of the tool holder 113. The thickness of the spacer 17 is set to an amount corresponding to a gap specified in JIS or ISO standard (gap between the end face 101 of the spindle 110 and the end face 152 of the flange portion 115, about 3 mm, for example)±manufacturing tolerance (±0.4 mm, for example). More specifically, the spacer 17 has a thickness greater than the sum of the gap specified in JIS or ISO standard and a maximum manufacturing tolerance.

In actuality, the tool holder 113 is attached to the spindle 110, and the gap between the end face 101 of the spindle 110 and the end face 152 of the flange portion 115 is measured by use of, for example, a micrometer. On the basis of the measured gap, the thickness of the spacer 117 is determined.

A number of roughened portions 171 are formed on the adhesive application face of the spacer 117 in order to enhance adhesion to the end face 101 of the spindle 110.

The roughened portions 171 assume the form of V-cut or flat-bottomed grooves A extending in radial directions of the spacer 117 and arranged in the circumferential direction of the spacer 117. Cut portions 172 are formed in the spacer 117 so as to correspond to the drive keys 102 projecting from the end face 101 of the spindle 110. The cut portions 172 are adapted to prevent interference of the spacer 117 with the drive keys 102 when the spacer 117 is to be bonded to the end face 101 of the spindle 110.

According to the tool holder attachment mechanism of the present embodiment described above, the spacer 117 having a thickness corresponding to a specified gap±manufacturing tolerance is bonded to the end face 101 of the spindle 110. Accordingly, a single spacer 117 is applicable to every tool holder 113. Also, the end face 152 of the flange portion 115 of the tool holder 113 can be reliably brought into close contact with the end face 101 of the spindle 110 via the spacer 117.

Even when the taper hole 111 formed in the spindle 110 wears as a result of repeated attachment and detachment of the tool holder 113, a layer of adhesive 118 absorbs the wear to thereby maintain close contact between the taper shank portion 114 and the taper hole 111, so that the tool holder 113 can be reliably attached to the spindle 110.

Particularly, in the present embodiment, through use of the spacer 117 of wear-resistant hard rubber, even when the taper hole 111 formed in the spindle 110 wears, the spacer 117 absorbs the wear to thereby maintain close contact between the taper shank portion 114 and the taper hole 111, so that the tool holder 113 can be reliably attached to the spindle 110.

According to the present embodiment, the roughened portions 171 are formed on the adhesive application face of the spacer 117, thereby yielding an anchoring effect on the adhesive 118 when the adhesive 118 is applied to the spacer 117. Thus, adhesion of the spacer 117 to the end face 101 of the spindle 110 can be enhanced, thereby establishing a strong bond therebetween.

Figure 12:
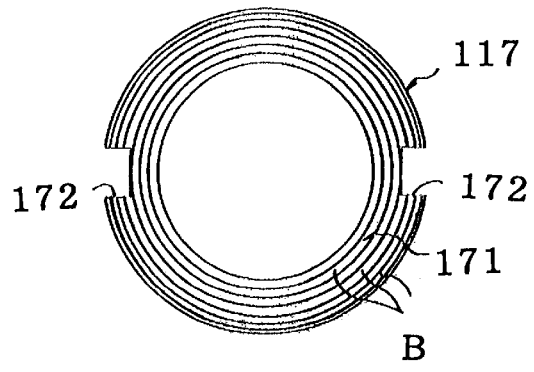
FIG. 12 is a plan view showing another example of the spacer of FIG. 11.

FIG. 12 is a plan view showing another example of the spacer used in the present invention.

The spacer 117 of FIG. 12 differs from that of FIG. 11 in that a plurality of concentric grooves B are formed in the adhesive application face of the spacer 117 and serve as the roughened portions 171.

The spacer 117 of FIG. 12 also provides actions and effects similar to those provided by the spacer 117 of FIG. 11.

Figure 13:
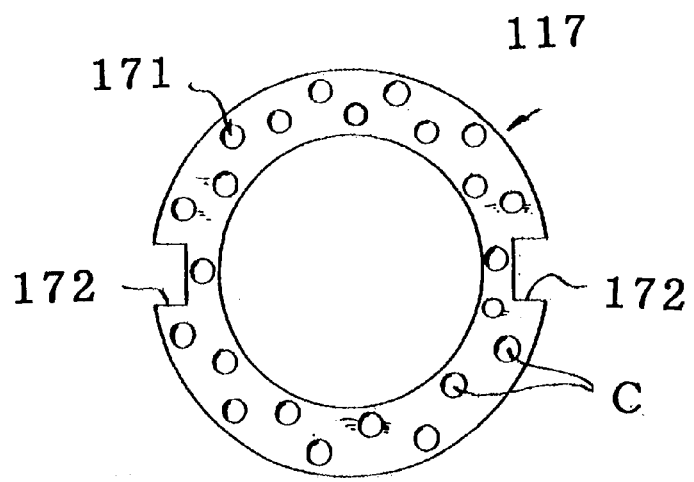
FIG. 13 is a plan view showing still another example of the spacer of FIG. 11.

FIG. 13 is a plan view showing still another example of the spacer used in the present invention. The spacer 117 of FIG. 13 differs from that of FIG. 11 in that a number of pits C are formed in the adhesive application face of the spacer 117 and serve as the roughened portions 171.

The spacer 117 of FIG. 13 also provides actions and effects similar to those provided by the spacer 117 of FIG. 11.

Figure 14:
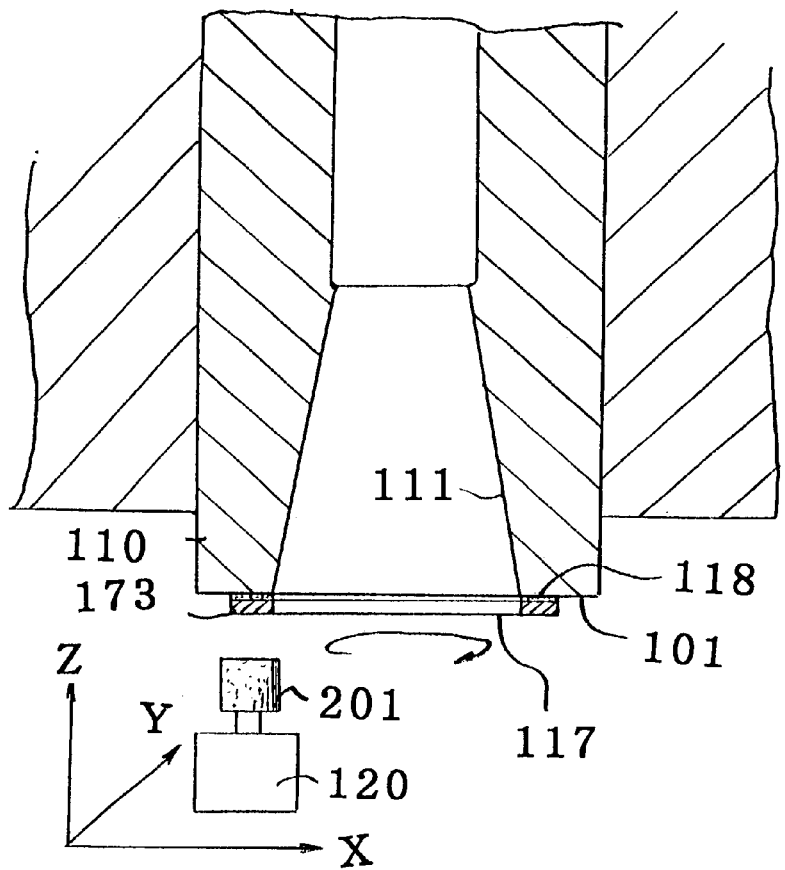
FIG. 14 is a view for explaining a case where a spacer of the tool holder attachment mechanism of the present invention bonded to the end face of a spindle permits attachment, to the spindle, of a tool holder involving a problem in that a gap specified in an industrial standard cannot be formed.

With reference to FIG. 14, there will be described a case where a tool holder involving a problem in that a gap specified in an industrial standard cannot be formed (a problem in that the gap between the end face of a flange portion and the end face of a spindle becomes smaller than a gap (about 0.5 mm to 1 mm) specified in an industrial standard) is rendered attachable to a spindle to which a spacer according to the present invention is bonded.

As shown in FIG. 10, when a tool holder involving a problem in that the gap between the end face of a flange portion and the end face of a spindle becomes smaller than a gap specified in an industrial standard is attached to a spindle to which a spacer having a thickness corresponding to a specified gap±manufacturing tolerance is bonded, the spacer interferes with sufficient insertion of a taper shank portion of the tool holder into a taper hole formed in the spindle. As a result, the taper shank portion fails to come into close contact with the taper hole; thus, the tool holder cannot be reliably attached to the spindle.

As shown in FIG. 14, the present invention provides measures to cope with the above problem Specifically, an exposed face 173 of the spacer 117 bonded to the end face 101 of the spindle 110 is ground by use of a grinding wheel apparatus 120 in an amount equal to the difference between a gap specified in an industrial standard and the gap between the end face 101 of the spindle 110 and the end face of the flange portion of a tool holder to be attached to the spindle 110, thereby rendering the thickness of the spacer 117 compatible with the tool holder to be attached.

In this case, the spacer 117 is ground as illustrated in FIG. 14. While the spindle 110 is rotated in the direction of the arrow, a grinding wheel apparatus 200 equipped with a rotating grinding wheel 201 is fed in the direction of a Z-axis, thereby grinding the exposed face 173 of the spacer 117.

Notably, when the drive keys 102 (see FIG. 10) of the spindle 110 are detachable, the drive keys 102 are detached from the spindle 110 before grinding.

According to the above-described feature of the present invention, the face 173 of the spacer 117 which faces the flange portion is ground in an amount equal to the difference between a gap specified in an industrial standard and the gap between the end face of the flange portion and the end face of the spindle, thereby reducing the thickness of the spacer 117. Thus, the spacer 117 bonded to the end face of the spindle can be used with a tool holder involving a problem in that a gap specified in an industrial standard cannot be formed. Also, the spacer 117 enables reliable attachment of the tool holder to the spindle without impairment in close contact between the taper shank portion and the taper hole.

Figure 15:
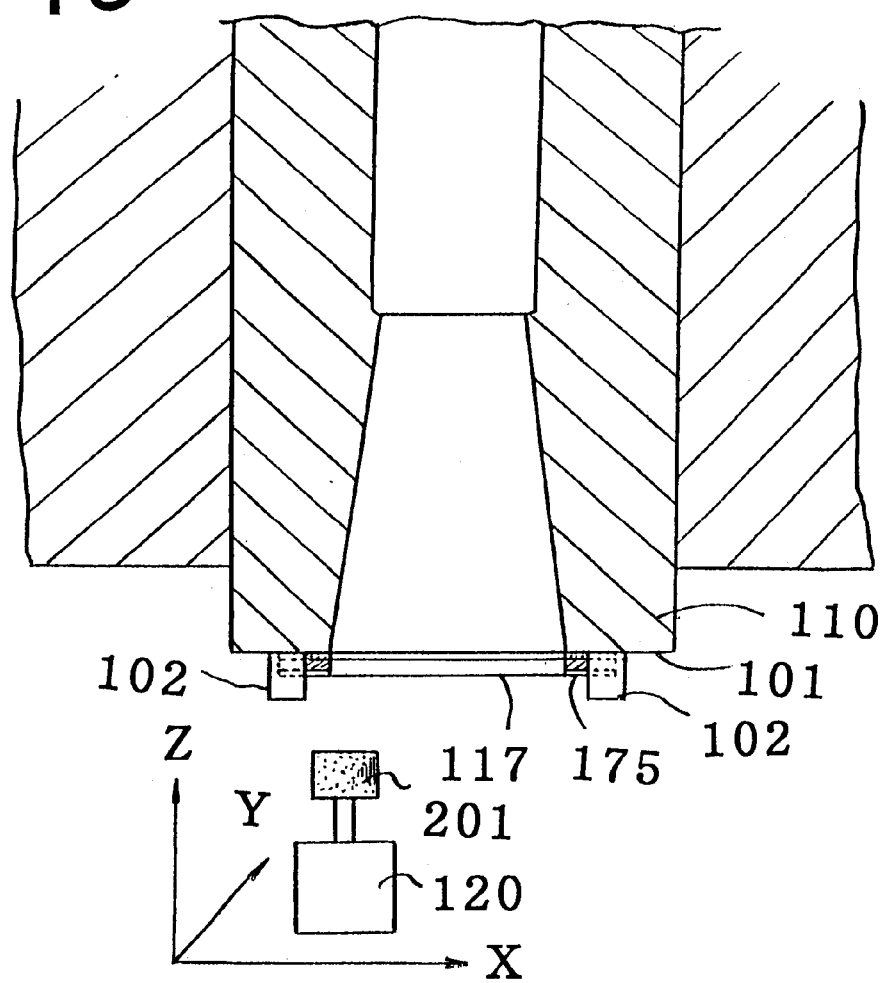
FIG. 15 is a view for explaining a case where a spacer of the tool holder attachment mechanism of the present invention bonded to the end face of a spindle equipped with drive keys permits attachment, to the spindle, of a tool holder involving a problem in that a gap specified in the industrial standard cannot be formed.
Figure 16:
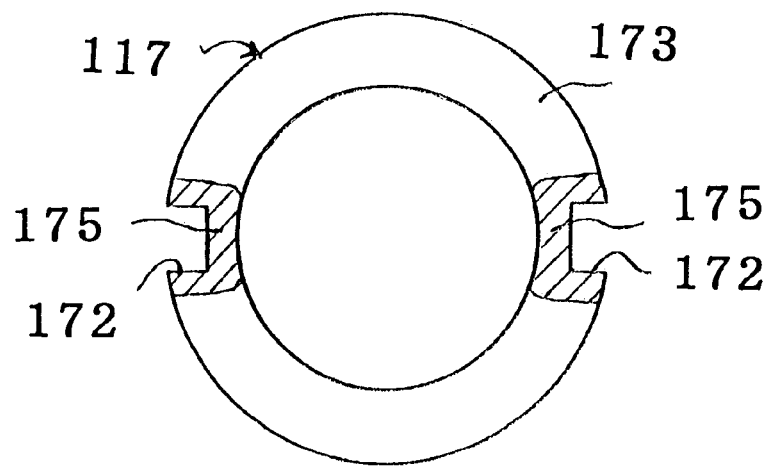
FIG. 16 is a bottom view showing the spacer of FIG. 15.
Figure 17:
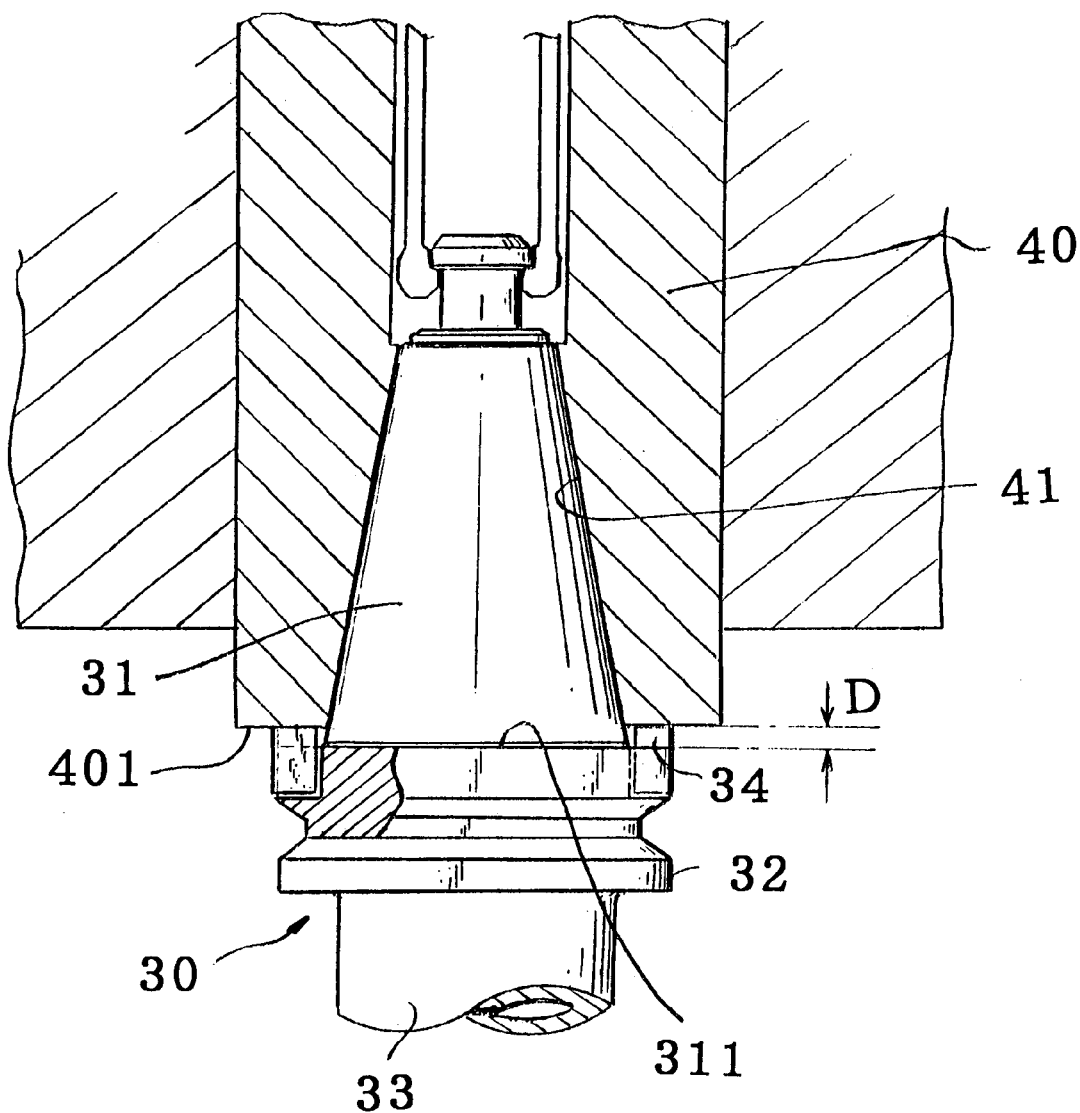
FIG. 17 is a longitudinal sectional view of a conventional tool holder attachment mechanism.

With reference to FIGS. 15 and 16, there will be described a case where a tool holder involving a problem in that a gap specified in an industrial standard cannot be formed (a problem in that the gap between the end face of a flange portion and the end face of a spindle becomes smaller than a gap (about 0.5 mm to 1 mm) specified in an industrial standard) is rendered attachable to a spindle which includes integral drive keys and to which a spacer according to the present invention is bonded.

In this case, as shown in FIG. 16, the thickness of portions (hatched portions) 175 of the spacer 117 around the cut portions 172 is rendered beforehand, for example, about 0.6 mm to 1.1 mm less than the specified gap±manufacturing tolerance.

A tool holder involving a problem in that the gap between the end face of a flange portion and the end face of a spindle becomes smaller than a gap specified in an industrial standard can be attached as described below to a spindle which includes integral drive keys and to which the spacer 117 as treated above is bonded. As shown in FIG. 15, while the spindle 110 is held at a halt, a grinding wheel apparatus 120 equipped with a rotating grinding wheel 201 is moved in the directions of X- and Y-axes and is fed in the direction of a Z-axis, thereby grinding the exposed face 173 of the spacer 117 except the portions 175 around the cut portions 172.

According to the above-described feature of the present invention, even when the drive keys 102 project from the end face 101 of the spindle 110, the spacer 117 bonded to the end face 101 can be easily ground to a required thickness.

What is claimed is:

1. A tool holder to be removably fitted into a taper hole which is formed in a spindle of a machine tool such that diameter decreases rearward comprising:

a holder body having a shank portion and a flange portion formed at a front side of the shank portion;

a taper cone fitted to the shank portion and tapered such that diameter decreases rearward;

an elastic member interposed between a rear-end portion of the flange portion and a front-end portion of the taper cone fitted to the shank portion; and a stopper member disposed on the shank portion and adapted to support a rear-end face of the taper cone fitted to the shank portion, wherein an outer circumferential surface of the taper cone is tapered at an angle equal to that at which a wall surface of the taper hole is tapered; and an inner circumferential surface of the taper cone and an outer circumferential surface of the shank portion are tapered at least partially with respect to an axial direction such that diameter decreases rearward, at equal angles smaller than the angle at which the outer circumferential surface of the taper cone is tapered.

2. A tool holder according to claim 1, wherein the inner circumferential surface of the taper cone and the outer circumferential surface of the shank portion are tapered substantially entirely with respect to the axial direction.

3. A tool holder according to claim 1, wherein an outer circumferential surface of a front portion of the shank portion and an inner circumferential surface of a front portion of the taper cone are tapered such that the diameters decrease rearward, at equal angles less than the angle at which the outer circumferential surface of the taper cone is tapered; the front portion of the taper cone is fitted to the front portion of the shank portion; a gap is formed between an intermediate portion of the shank portion and an intermediate portion of the taper cone, an outer circumferential surface of a rear portion of the shank portion and an inner circumferential surface of a rear portion of the taper cone are formed so as to extend straight; and the rear portion of the taper cone is fitted to the rear portion of the shank portion.

4. A tool holder according to claim 1, wherein a slit is formed in the taper cone obliquely with respect to an axial direction over an entire length of the taper cone, and the slit is filled with an elastic member such that the elastic member is bonded to the taper cone.

5. A tool holder according to claim 1, wherein a front slit and a rear slit are formed in the taper cone obliquely with respect to the axial direction at equal angles such that the front and rear slits extend from front and rear ends of the taper cone, respectively, while maintaining a circumferential interval therebetween; and the front and rear slits are filled with an elastic member such that the elastic member is bonded to the taper cone.

6. A tool holder according to claim 1, wherein an annular depression is formed on a rear-end face of the flange portion along a circumference of a front-end portion of the shank portion; at least a portion of the elastic member is accommodated in the annular depression so as to support a front-end face of the taper cone; and the elastic member comprises a plurality of Belleville springs and a washer disposed at at least a front or rear side of the plurality of Belleville springs.

7. A tool holder according to claim 1, wherein at least any one of a washer, a spring washer, and a nut to be screw-engaged with a rear-end portion of the shank portion is disposed at the rear-end portion of the taper cone so as to serve as the stopper member.

8. A tool holder according to claim 1, wherein a pair of arcuate shims are removably attached to a rear-end face of the flange portion in such a manner as to be located outside an annular depression formed on the rear-end face and are adapted to abut an end face of the spindle.

9. A tool holder according to claim 1, wherein components of the tool holder are treated for corrosion protection.

\* \* \* \* \*